United States Patent [19]

Chapman et al.

[11] Patent Number: 4,710,963

[45] Date of Patent: Dec. 1, 1987

[54] APPARATUS FOR SENSING THE CONDITION OF A DOCUMENT

[75] Inventors: Victor B. Chapman; Paul D. Lacey, both of Hants, England

[73] Assignee: De La Rue Systems Ltd., England

[21] Appl. No.: 870,766

[22] PCT Filed: Sep. 11, 1985

[86] PCT No.: PCT/GB85/00414

§ 371 Date: May 9, 1986

§ 102(e) Date: May 9, 1986

[87] PCT Pub. No.: WO86/01923

PCT Pub. Date: Mar. 27, 1986

[30] Foreign Application Priority Data

Sep. 11, 1984 [GB] United Kingdom ................ 8422928

[51] Int. Cl.$^4$ ................................................ G06K 9/60

[52] U.S. Cl. ........................................ 382/7; 382/50; 356/71; 209/534; 250/556

[58] Field of Search ...................... 382/7, 50; 250/556; 209/534; 356/71, 237

[56] References Cited

U.S. PATENT DOCUMENTS

| | | | |
|---|---|---|---|
| 3,759,382 | 9/1973 | Walkley | 209/534 |
| 3,922,539 | 11/1975 | Carnes | 364/478 |
| 3,938,663 | 2/1976 | Carnes | 250/556 |
| 3,944,979 | 3/1976 | Kwok | 382/50 |
| 4,041,456 | 8/1977 | Ott | 382/7 |
| 4,189,235 | 2/1980 | Guter | 356/239 |
| 4,208,652 | 6/1980 | Marshall | 382/18 |
| 4,255,057 | 3/1981 | Williams | 209/534 |
| 4,298,807 | 11/1981 | Favre | 356/71 |
| 4,550,433 | 10/1985 | Takahashi | 356/237 |
| 4,592,090 | 5/1986 | Curl | 356/71 |
| 4,628,194 | 12/1986 | Dobbins | 382/7 |
| 4,650,319 | 3/1987 | Stengel | 356/71 |

FOREIGN PATENT DOCUMENTS

| | | |
|---|---|---|
| 0072237 | 2/1983 | European Pat. Off. . |
| 1422563 | 1/1976 | United Kingdom . |

*Primary Examiner*—David K. Moore
*Assistant Examiner*—Anne Skinner
*Attorney, Agent, or Firm*—Ostrolenk, Faber, Gerb & Soffen

[57] ABSTRACT

This application discloses a method and apparatus for ascertaining the fitness of a document having some printed regions and some unprinted regions, by determining its degree of soiling. A sensor (16) provides reflectance signals representing the intensity of light reflected from a number of sensed elements on the face of the document. A signal processing circuit responsive to the reflectance signals includes means (26) for determining for each of a number of areas of the document, the number of elements in the area which result in a signal level exceeding a first threshold which represents the upper limit of brightness for printed areas on the document; and means (24,34,36) for determining whether the number of elements exceeding the first threshold reaches a given proportion of the total number of sensed elements for that area. Each area is then given a brightness value dependent on the relationship between a second threshold, representing the upper limit of brightness for unprinted areas having an excessive degree of soiling, and those signal levels of the elements of the area which exceed the first threshold. The fitness or unfitness of the document is judged from the brightness values of all such areas.

16 Claims, 5 Drawing Figures

APPARATUS FOR SENSING THE CONDITION OF A DOCUMENT

BACKGROUND OF THE INVENTION

The present invention relates to apparatus and a method for sensing documents, such as banknotes or other security notes, having a pattern printed over at least a part of their surface, to assess the degree of soiling.

It is known to sense the condition of a document by detecting light reflected from its surface and then comparing the intensity of the reflected light with a threshold to determine whether the document should be accepted or rejected. Variations in printed intensity and of ink colour present problems with such a method. Filters may be used to match the colour of the incident light to the ink colour, to suppress the colour information, except where black ink is present on the document. However, this does not give very satisfactory results, in our experience. We have also attempted to measure the degree of soiling by measuring the contrast between elemental areas on a note, again without very satisfactory results.

BRIEF DESCRIPTION OF THE INVENTION

According to the present invention, apparatus for determining the fitness of a document by determining its degree of soiling, comprises: a sensor for providng a reflectance signal representing the intensity of light reflectd from a sensed element of the face of the document; and a signal processing circuit responsive to the reflectance signals from the sensor corresponding to sensed elements on the face of the document to provide a "fit" or an "unfit" signal for a document, depending upon the degree of soiling, the signal processing circuit including means for generating a brightness value, derived solely from the reflectance signals whose level exceeds a first threshold, and means for generating a "fit" signal for the document only if the brightness value exceeds a second threshold.

In the preferred embodiment, the document is effectively divided into a large number of areas, each containing a number of elements for sensing, the brightness of each area being individually assessed. Thus, according to another aspect of the invention, apparatus for determining the fitness of a document having some printed regions and some unprinted regions, by determining its degree of soiling, comprises: a sensor for providing a plurality of reflectance signals representing the intensity of light reflected from a plurality of sensed elements of the face of the document; and a signal processing circuit responsive to the reflectance signals including means determining, for each of a number of areas of the document each area comprising a number of elements for sensing, whether the number of sensed elements resulting in a signal level exceeding a first threshold representing the upper limit of brightness for printed areas of the document, reaches a given proportion of the total number of sensed elements for that area; means responsive to the relationship between a second threshold representing the upper limit of brightness for unprinted areas having an excessive degree of soiling, and those signal levels of the elements of the area, which exceed the first threshold, to provide a brightness value for each area; and means responsive to the brightness values of all such areas to generate a "fit" or an "unfit" signal for the document.

However, it is not essential to assess the document area by area; for example, the output of the sensor can be applied to a first comparator, for comparing the sensor output level with a first predetermined threshold, and the sensor output can be integrated over only those periods in which its level exceeds the first predetermined threshold. This provides a total reflectance signal indicative of the total reflectance of the brighter areas of the face of the document; and by comparing this total reflectance signal with the total duration of the periods for which the reflectance signal level exceeds the first threshold, a "fit" or "unfit" decision can be made for the document.

In another form, the apparatus includes means responsive to signals derived from elements of the document whose brightness exceeds a first threshold, for counting the number of such signals which represent a brightness exceeding a second threshold. Means responsive to the number of such signals exceeding the second threshold, relative to the number exceeding the first threshold, may then generate a "fit" signal only if a predetermined ratio is exceeded.

BRIEF DESCRIPTION OF THE DRAWINGS

In order that the invention may be better understood, an example of apparatus and a method embodying the invention will now be described with reference to the accompanying drawings, in which.

DETAILED DESCRIPTION OF THE PREFERRED EMBODIMENTS

Figure 1:
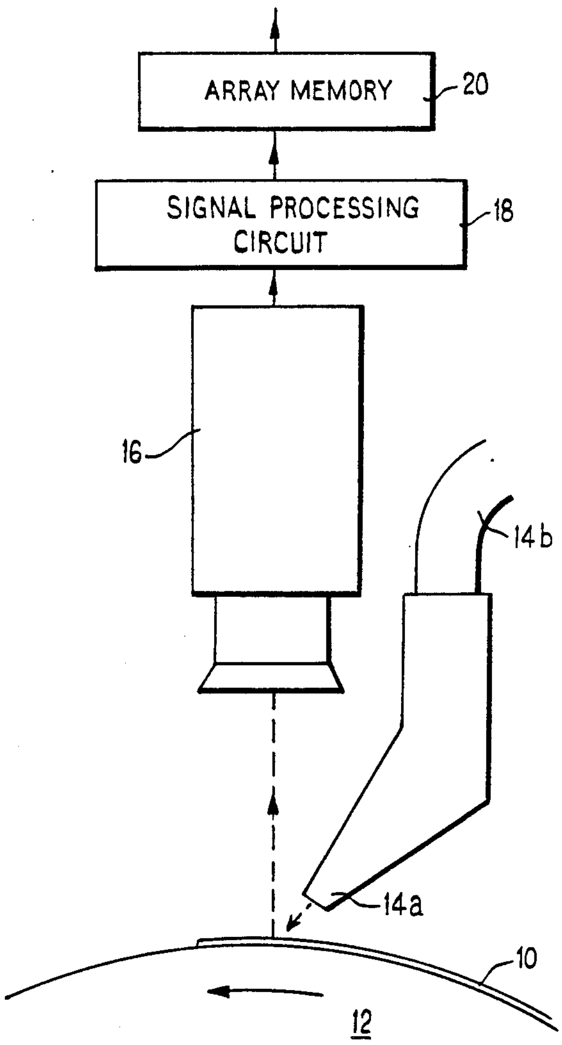
FIG. 1 shows the apparatus in broad outline.

In FIG. 1, a document 10 mounted on a rotating drum 12 passes under a scanning station comprising an illuminating device 14 and a charge-coulpled line scan camera 16. The illuminating device 14 includes a fibre optic fishtail which, at its front end 14*a*, has its fibre optics spread into a line covering the whole or a desired part of the width of the document 10. The fibre optics extend, in the form of a bundle 14*b*, to a light source (not shown).

The line scan camera 16, using the principle of the charge-coupled device (CCD), is of a commercially available kind.

The output of the camera 16 is applied to a signal processing circuit 18 which, for each element of the CCD array, provides an electric signal representing an evaluation of the reflection from the document. This evaluation signal is stored in the array memory 20, the contents of the memory forming the basis of the decision as to the fitness of the note.

The operation of the apparatus will now be described with reference to FIGS. 2 and 3. In the following explanation, the processing of signals from a single element of the CCD array will be considered.

Figure 2:
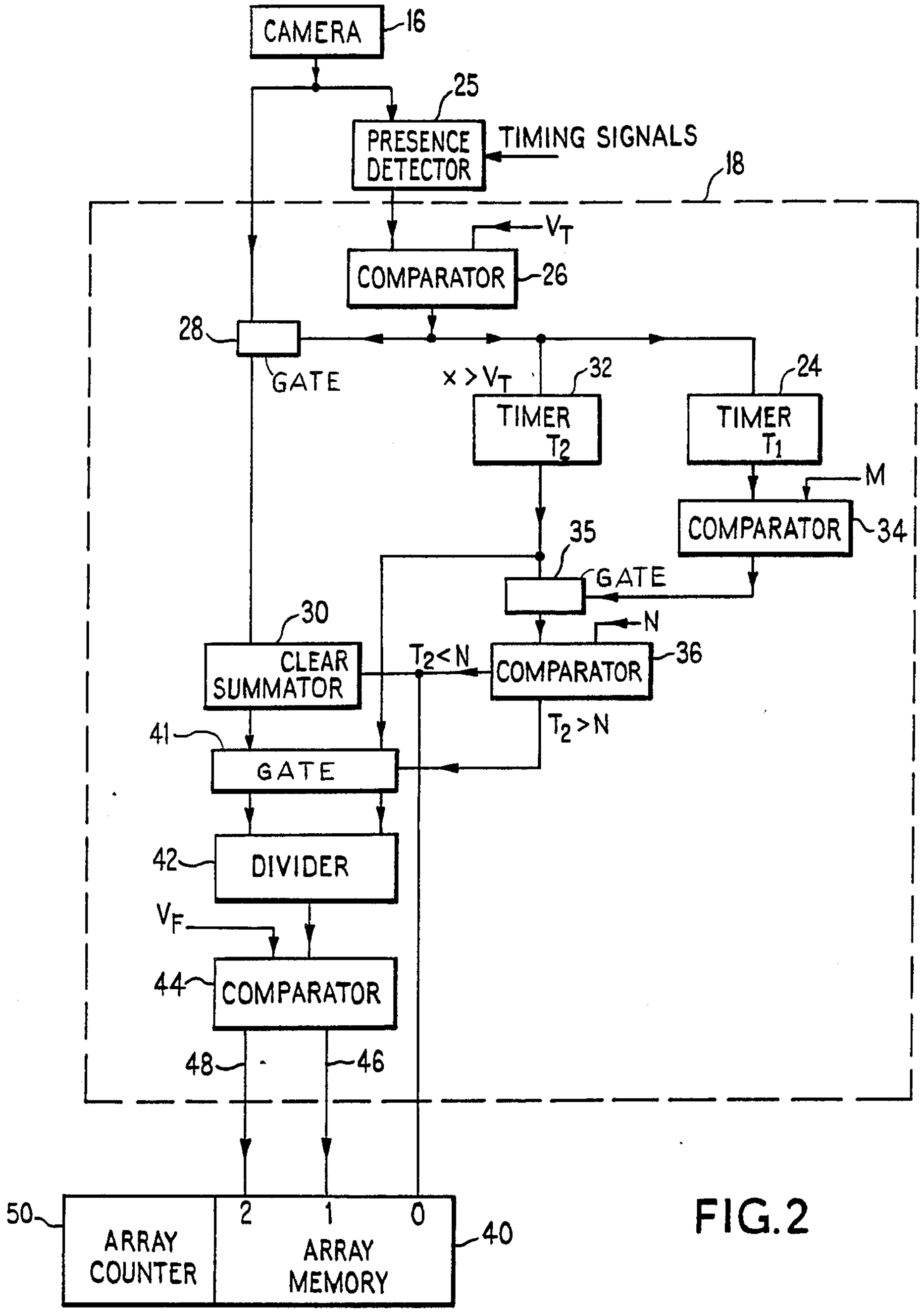
FIG. 2 is a block diagram of the signal processing circuit in FIG. 1.

Referring first to FIG. 2, the data processing circuit includes first and second timers (counters) 24 and 32 respectively; comparators 26, 34, 36 and 44; a gate 28; a summator circuit 30; a divider circuit 42; and an array counter 50. The outputs of the signal processing circuit are fed into an array memory 40.

The operation of this circuit will now be described with reference to the flow diagram of FIG. 3. To initialize the equipment, in a first step 100 the summator 30 and the array counter 50 are cleared. The output of a presence-detector 25 is then examined in a second step 102, to ascertain whether there is a note under the head. In the absence of a note, the output of the presence detector 25 is repeatedly checked. When a note appears, the camera output, representing the reflectivity of an element of the banknote, is compared with a threshold voltage $V_T$ by the comparator 26 of FIG. 2 in a step 104.

If the camera output is less than $V_T$, the first timer (counter) 24 is incremented (step 108).

If the camera output exceeds $V_T$, a gate 28 is opened by the comparator output to pass the camera output to a summator 30 (step 106). In the same step, the second timer (counter) 32 is incremented; the first timer 24 is also incremented by step 108.

The output of the timer 24 is applied to a comparator 34, where it is compared with a reference value M (step 110). If it is not yet equal to M, steps 104, 106, 108 and 110 are repeated. This value M may be equated to a fixed length of note, for example 5 mm. When the count M is reached, the output of comparator 34 enables gate 35 to cause the output of the second timer 32 to be applied to the comparator 36, where it is compared with a reference value N(step 112), equal to another fixed length of note, for example 3 mm. The value N is always less than the value M. For the examples given above, if value N has been equalled or exceeded in timer 32, it indicates that at least 3 mm of the 5 mm of note scanned has resulted in the camera output exceeding the threshold $V_T$. As the threshold $V_T$ is set to be higher than the maximum output for a printed area of a clean document, this means that at least 3 mm of the scanned 5 mm is unprinted.

Figure 3:
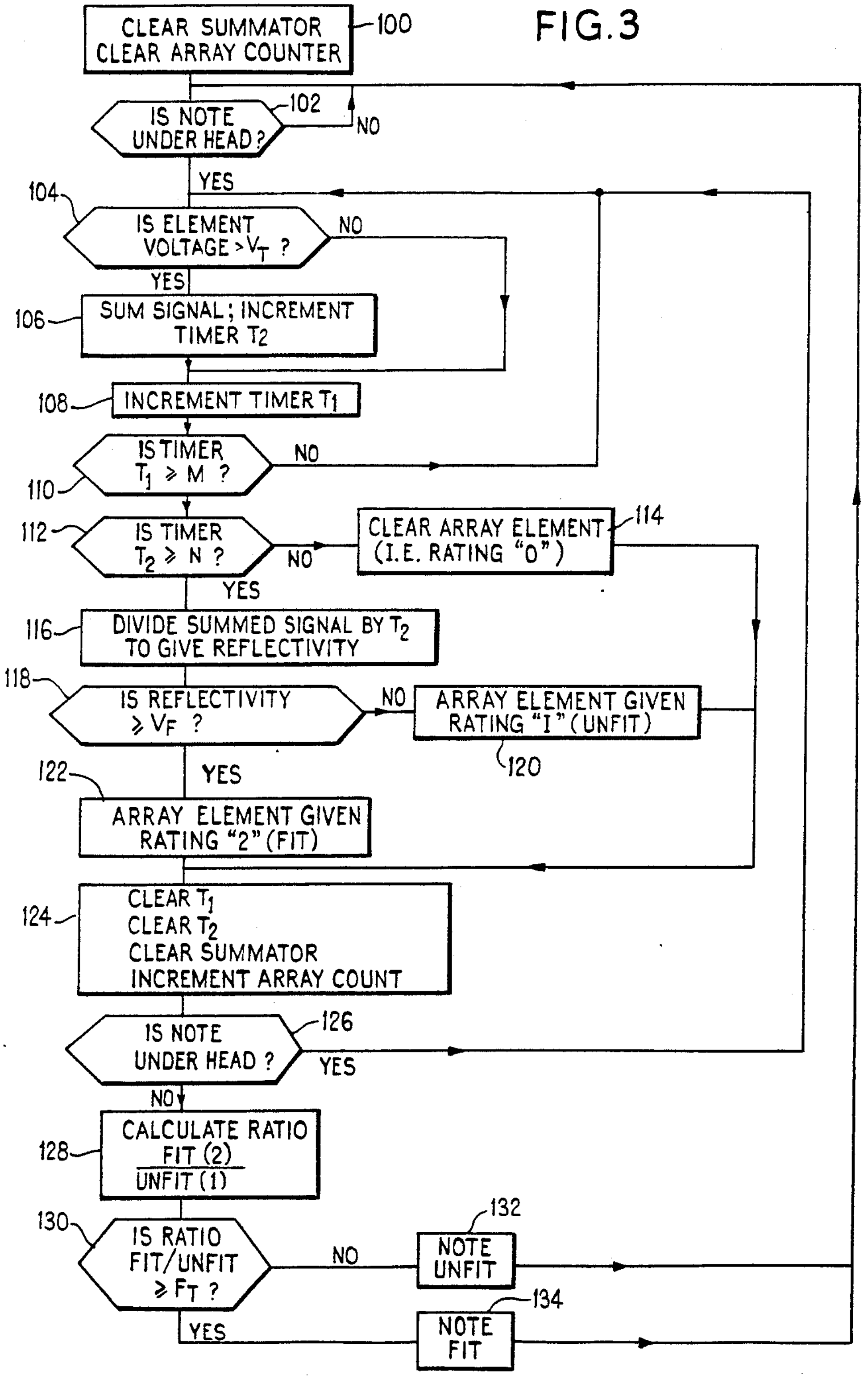
FIG. 3 is a flow diagram, illustrating the operation of the apparatus of FIGS. 1 and 2.

If the count in timer 32 is less than N, the summator 30 is cleared and a rating "0" is applied to the array memory 40 of FIG. 2 (step 114 of FIG. 3).

If the output of timer 32 exceeds or is equal to N, then in step 116 the output S of the summator 30 (representing the sum of the camera outputs for the elements for which the camera output signals exceeded $V_T$) is applied through gate circuit 41 to a divider 42, along with the output of the second timer 32; the divider circuit 42 produces an output representing the result of dividing the signal S by the count in timer 32 to give a measure of the average reflectivity of those elements of the array for which the threshold $V_T$ is exceeded.

In step 118, this measured average reflectivity per unit area is compared in a comparator 44 with a fitness threshold $V_F$. If this fitness threshold is exceeded, the comprator provides a rating "2" over line 48 to the array memory 40 (step 122). If the fitness threshold is not exceeded, a rating of "1" is applied to the array memory 40 over line 46 (step 120).

In this way, an evaluation of this array of elements has been carried out and a figure has been entered in the appropriate section of the array memory 40. In the next step, 124, the counters 24 and 32 are cleared, as is the summator 30, and the array count 50 is incremented by 1.

The next segment, i.e. array of elements, will then be considered, provided that the note is still under the head (step 126).

This procedure is followed independently by each unit of the CCD assembly until the banknote has been completely scanned and the array memory is filled.

In step 128, the ratio of fit segments (rating 2) to unfit segments (rating 1) is calculated and in step 130 this ratio is compared with a threshold ratio $F_T$. If the calculated ratio is less than the threshold ratio the note is classified "unfit"; if it is equal to or exceeds the threshold ratio the note is passed as "fit".

Figure 4:
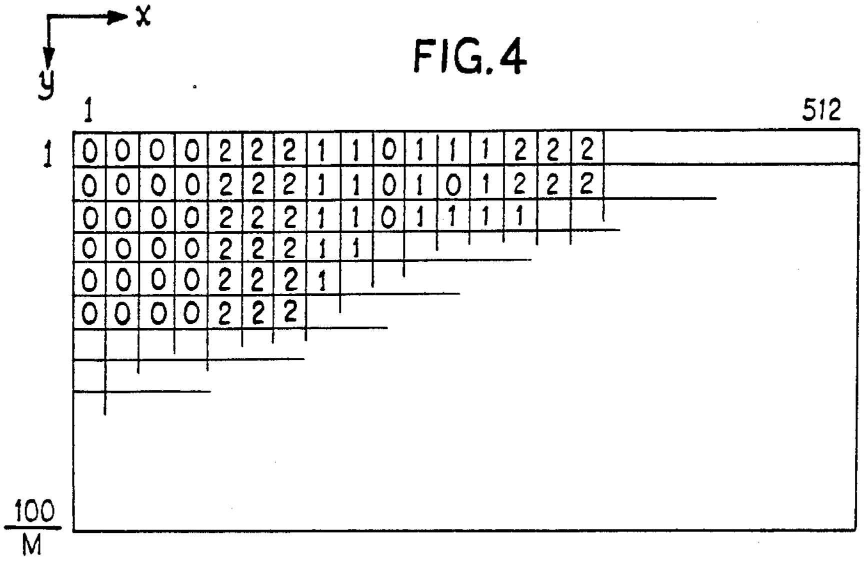
FIG. 4 illustrate the contents of the array memory, in one method of operation.

FIG. 4 represents the contents of the array memory 40 after a banknote has been interrogated. Cells of the array memory 40 corresponding to areas outside the banknote boundary are rated as O. Each cell of the array memory corresponding to an area inside the banknote boundary is given a value (0, 1 or 2) reprsenting the result of the evaluation of the corresponding array of scanned elements.

The information stored in the array memory 40 can now be processed to give a measure of the background soil level of the note and the amount of localized soiling on the unprinted areas of the note.

In the example shown in FIG. 4, each element represents an area, interrogated by a 512 line camera, which is 0.5 mm in the x-direction and Mmm in the y-direction. The value in the x-direction is defined by the resolution of the camera. It has been assumed that the maximum width of banknote that will be encountered is 100 mm.

The background soil may be determined by calculating the ratio: (number of cells with a "2" rating) divided by (number of cells with a "1" rating). This ratio is then compared with a preset threshold which, if equalled or exceeded will result in the classification of the banknote as "fit"; otherwise, the note is classified as "unfit".

Although a banknote may be classified as "fit" according to the above-described criteria, localized regions of soiling may require that the note be classified "unfit". These locally soiled regions may be identified by searching the array memory 40, row by row, to locate groups of contiguous cells having the "unfit" rating 1. Groups exceeding a predetermined size may be counted and if a critical count is exceeded, the note will be classified as "unfit".

In an alternative method of measuring localized soil, if after measuring the reflectivity per unit area of a banknote segment and comparing it with $V_F$, the segment is classified "fit", a counter is incremented; otherwise, the counter is not incremented. This is repeated for each segment of the note and the procedure is followed independently by each element of the CCD assembly until the note has been completely scanned. The accumulated totals in each counter are summed and the overall total count $C_T$ is then a measure of the fitness of the banknote. If this total count exceeds a final threshold $C_F$, the note is classified as "fit"; otherwise it is classified as "unfit".

However, to sum the values for all individual segments over a number of successive scans necessitates the use of 512 identical units of hardware, each comprising timers, summators, storage, etc.

Figure 5:
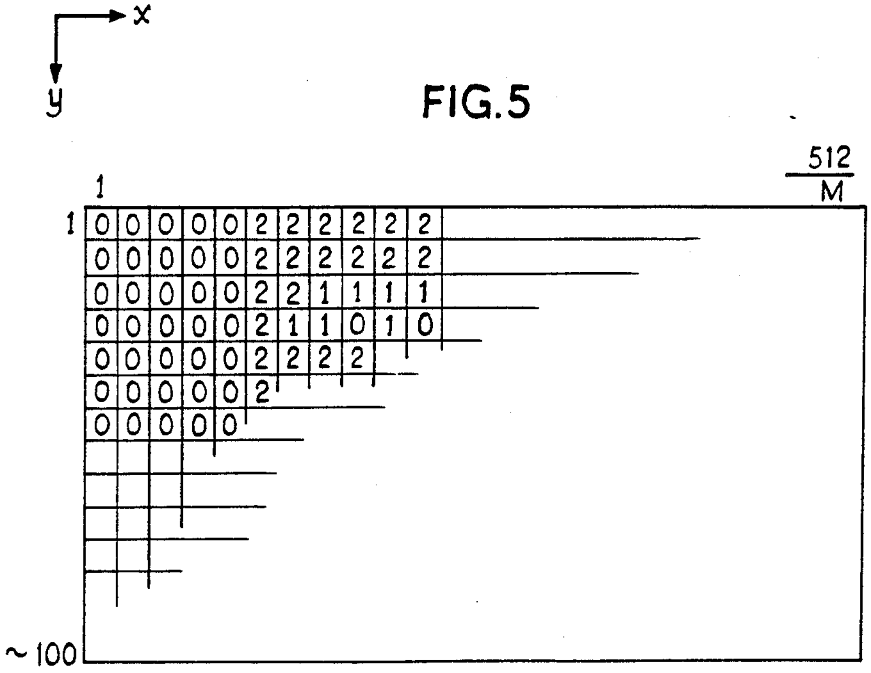
FIG. 5 illustrates the contents of the array memory in another method of operation.

A considerable simplification and reduction in hardward can be achieved by applying the process shown in the flow diagram to the summation of groups of elements within the same scan; the result of this in the contents of the array memory, is shown in FIG. 5. In the y-direction of FIG. 5, which is the direction of travel of the banknote, the note will move for example approximately 0.5 mm in the time taken to gather data from a single scan using a 512-element line-scan camera.

As the camera resolution is 0.5 mm, the dynamic resolution in the y-direction is about 1 mm. The information can now be dealt with in real time by one unit of hardware.

As indicated above, consideration of the face of the document area-by-area, as is in the example described, is not essential to the invention. As an example the signal processing circuit may operate by comparing the integrated brightness of the sensor output, during periods in which the sensor output exceeds the first threshold, with the integrated duration of the periods for which the sensor output exceeds the first threshold. Alternatively, instead of giving a "brightness rating" to each area of the document (each area containing a number of sensed elements), each sensed element can be given a brightness rating.

What is claimed is:

1. Apparatus for determining the fitness of a document by determining its degree of soiling, comprising:

(A) sensor means for providing a reflectance signal representing the intensity of light reflected from a sensed element of the face of the document; and (B) signal processing means responsive to the reflectance signals from the sensor corresponding to sensed elements on the face of the document to provide a "fit" or an "unfit" signal for a document, depending upon the degree of soiling, the signal processing means including:

(1) a first comparator for comparing the level of the signal from the sensor means with a first predetermined threshold;

(2) means for integrating the signal only over periods in which the signal level exceeds the first predetermined threshold, to provide a total reflectance signal indicative of the total reflectance of the brighter areas of the face of the document;

(3) means for providing a duration signal representing the total time that the reflectance signal level exceeds the first threshold; and (4) means for comparing the total reflectance signal and the duration signal to provide a "fit" or "unfit" output signal.

2. Apparatus for determining the fitness of a document having some printed regions and some unprinted regions, by determining its degree of soiling, said apparatus comprising:

sensor means for providing a plurality of reflectance signals representing the intensity of light reflected for a plurality of sensed elements of the face of the document;

signal processing means responsive to the reflectance signals, said signal processing means including means determining, for each of a number of areas of the document, each area comprising a number of sensed elements, whether the number of sensed elements resulting in a signal level exceeding a first threshold representing the upper limit of brightness for printed areas of the document, reaches a given proportion of the total number of sensed elements for that area;

means for providing a brightness value for each said area as a function of the signal levels of those sensed elements which exceed said first threshold and a second threshold which represents the upper limit of brightness for unprinted areas of said document having an excessive degree of soiling; and means responsive to the brightness values of all such areas to generate a "fit" or an "unfit" signal for the document.

3. Apparatus in accordance with claim 2, in which the means determining whether at least a given proportion of the sensed elements results in a signal level exceeding a first threshold, comprises means for incrementing a first counter each time an element of the face of the document is sensed, means for incrementing a second counter each time that the signal corresponding to the sensed element exceeds the first threshold, and means operative to determine whether the count in the second counter has reached a predetermined value when the count in the first counter indicates that the whole of the area has been sensed.

4. Apparatus in accordance with claim 2, in which the means for providing a brightness value for each area comprises means operative to sum the sensor outputs for those elements of the area which exceed the first threshold and to divide the resulting sum signal by the number of elements of the area for which the sensor output has exceeded the first threshold, thereby to obtain a reflectivity signal, and means for comparing the reflectivity signal with the second threshold.

5. Apparatus according to claim 4, further including means for storing a first rating in a memory for each area for which the said reflectivity signal exceeds the second threshold, for storing a second rating for each area for which, although the given proportion of sensed elements provides signals exceeding the first threshold, the reflectivity is less than the second threshold, and for storing a third rating for each area in which the number of sensed elements exceeding the first threshold is less than the given proportion.

6. Apparatus in accordance with claim 5, in which the means responsive to the brightness values to generate the "fit" and "unfit" signals, includes means calculating the ratio of the number of areas for which a first rating has been stored to the number of areas for which a second rating has been stored, and means comparing this ratio with a further threshold, and means generating the "fit" and "unfit" signals on the basis of this comparison.

7. Apparatus in accordance with claim 1 wherein said sensor means includes a line-scan camera of the charge-coupled type (CCD) for scanning the elements of the face of the document.

8. Apparatus in accordance with claim 7, in which the document is illuminated, along the line sensed by the line-scan camera, by means of a light source and a fish-tail fibre optics device.

9. Apparatus in accordance with claim 1, in which the sensor means incorporates an eye-response filter.

10. Apparatus for determining the fitness of a document by determining its degree of soiling, comprising:

(A) sensor means for providing a reflectance signal representing the intensity of light reflected from a sensed element of the face of the document; and (B) signal processing means responsive to the reflectance signals from the sensor corresponding to sensed elements on the face of the document to provide a "fit" or an "unfit" signal for a document, depending upon the degree of soiling, the signal processing means including:

(1) means for counting the number of signals whose brightness exceeds a first threshold which represents the upper limit of brightness for printed areas of the document, and for counting the number of such signals whose level exceeds a second threshold which represent the upper limit of brightness for unprinted areas having an excessive degree of soiling; and (2) fitness-determining means responsive to the ratio of the number of signals exceeding the second threshold relative to the number exceeding the first threshold, to generate a "fit" signal only if a predetermined ratio is exceeded.

11. Apparatus in accordance with claim 10, wherein said sensor means includes a line-scan camera of the charge-coupled type (CCD) for scanning the elements of the face of the document.

12. Apparatus in accordance with claim 11, in which the document is illuminated, along the line sensed by the line-scan camera, by means of a light source and a fishtail fibre optics device.

13. Apparatus in accordance with claim 10, in which the sensor means incorporates an eye-response filter.

14. Apparatus in accordance with any one of the claims 1, 2–6 or 10, in which a number of elements of the document are scanned simultaneously, each by a different sensing element, the sensing elements scanning respective ones of parallel rows of elements and generating a corresponding number of signals, and in which the signal processing means responds to all such signals.

15. A method for determining the fitness of a document by determining its degree of soiling, said method comprising the steps of:

sensing the document for deriving signals representing the reflectivity of different element of the face of the document;

comparing the signal corresponding to each sensed element with a first threshold;

counting the number of sensed elements for which the signal exceeds the first threshold;

summing the signals which exceed the first threshold;

when the number of scanned elements reaches a first predetermined number, equivalent to a predetermined area of such elements, determining if the number of elements for which the signal exceeded the first threshold is greater than a second predetermined number, such areas providing useful reflectivity information, and if said determination is positive, dividing the summed brightness signal for such elements by the count of such elements, to give a measure of the reflectivity of elements of the area whose brightness exceeds the first threshold;

generating a signal representing a first rating for the area if the said reflectivity exceeds a predetermined value, and a second rating for the area if the reflectivity value is less than the predetermined value;

repeating the above steps until a desired number of areas have been sensed; and thereafter generating a "document fit" signal only if the number of areas which have been given the first rating is greater than a predetermined number.

16. A method for determining the fitness of a document by determining its degree of soiling, said method comprising the steps of:

sensing the document for deriving signals representing the reflectivity of different elements of the face of the document;

comparing the signal corresponding to each sensed element with a first threshold;

counting the number of sensed elements for which the signal exceeds the first threshold;

summing the signals which exceed the first threshold;

when the number of scanned elements reaches a first predetermined number, equivalent to a predetermined area of such elements, determining if the number of elements for which the signal exceeded the first threshold is greater than a second predetermined number, such areas providing useful reflectivity information, and if said determination is positive, dividing the summed brightness signal for such elements by the count of such elements, to give a measure of the reflectivity of elements of the area whose brightness exceeds the first threshold;

generating a signal representing a first rating for the area if the said reflectivity exceeds a predetermined value, and a second rating for the area if the reflectivity value is less than the predetermined value;

repeating the above steps until a desired number of areas have been sensed; and thereafter generating a "document fit" signal only if the number of areas which have been given the first rating is greater than a predetermined portion of the number of said areas providing useful reflectivity information.

* * * * *